United States Patent [19]

Baues

[11] 4,364,064

[45] Dec. 14, 1982

[54] OPTICAL DEVICE FOR NON-CONTACT RECORDING

[75] Inventor: Peter Baues, Krailling, Fed. Rep. of Germany

[73] Assignee: Siemens Aktiengesellschaft, Berlin & Munich, Fed. Rep. of Germany

[21] Appl. No.: 184,001

[22] Filed: Sep. 4, 1980

[30] Foreign Application Priority Data

Sep. 21, 1979 [DE] Fed. Rep. of Germany ....... 2938224

[51] Int. Cl.³ .................................................. G01D 9/42
[52] U.S. Cl. ...................................... 346/107 R; 355/1
[58] Field of Search ...................... 346/107 R; 354/4; 355/1; 358/302, 901; 350/96.20, 96.21

[56] References Cited

U.S. PATENT DOCUMENTS

| | | |
|---|---|---|
| 1,751,584 | 3/1930 | Hansell . |
| 3,952,311 | 4/1976 | Lapeyre .................................. 354/4 |
| 4,000,495 | 12/1976 | Pirtle ............................ 346/107 R X |
| 4,076,378 | 2/1978 | Cole ................................... 350/96.24 |
| 4,079,404 | 3/1978 | Comerford et al. ............... 350/96.2 |
| 4,268,113 | 5/1981 | Noel .................................... 350/96.2 |
| 4,275,962 | 6/1981 | Midorikawa et al. ................... 355/1 |

OTHER PUBLICATIONS

C. M. Schroeder, "Accurate Silicon Spacer Chips for an Optical-Fiber Cable Connector", The Bell System Technical Journal, vol. 57, No. 1, Jan. 1978, pp. 91–97.
Crow et al., "Laser Print Head . . . Channel". In IBM Technical Disclosure Bulletin, vol. 20, No. 6, pp. 2443, 2444, Nov. 1977.

Primary Examiner—John Gonzales
Attorney, Agent, or Firm—Hill, Van Santen, Steadman, Chiara & Simpson

[57] ABSTRACT

An optical device for non-contact recording image information on a recording material which is stretched into a cylindrical configuration by a recording head which is mounted on the guide device for movement parallel to the cylindrical axis along the surface of the recording material, and has a plurality of light waveguides in the form of glass fibers having entrance ends receiving modulated light from individual sources and exit ends facing the recording material and being densely packed in a linear arrangement characterized by the recording head including at least one adjustment plate having a plurality of individual grooves with one groove being provided with each of the waveguides which are secured therein with the exit ends being oriented in a line extending perpendicular to the cylindrical axis and the recording head including a light source member containing the individual light sources for each of the waveguides arranged at the spacing corresponding to the spacing at the entrance ends of the waveguides so that when the member is secured to the recording head, the individual light sources are aligned with the respective entrance ends of the fibers. Preferably the end of the recording head facing the cylinder has a concave surface with a radius of curvature slightly larger than the radius of curvature of the cylinder and the head may have a pair of adjustment plates whose grooves are aligned in pairs to receive a single row of fibers or whose grooves are offset to form two closely spaced offset rows of fibers.

6 Claims, 6 Drawing Figures

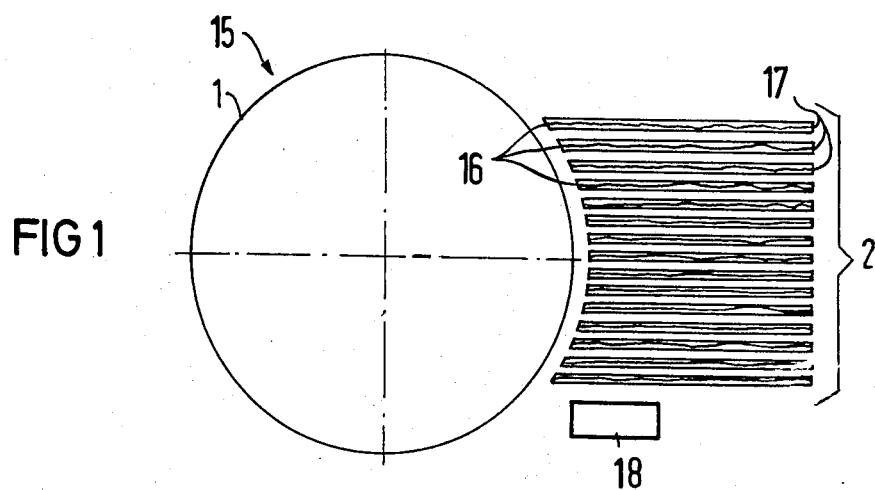
FIG 1
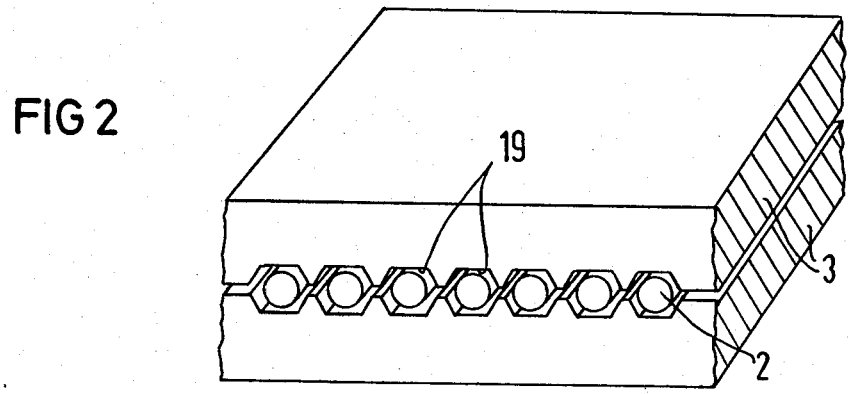
FIG 2
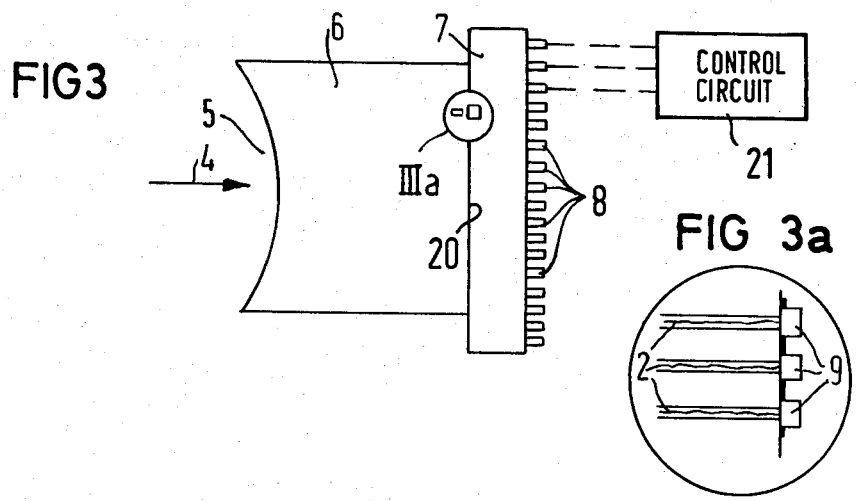
FIG 3
FIG 3a

OPTICAL DEVICE FOR NON-CONTACT RECORDING

BACKGROUND OF THE INVENTION

The present invention is directed to an optical device for non-contact recording image information onto a recording material which device includes a cylinder on which the recording material is stretched in a cylindrical configuration, and a recording head which is arranged to move parallel to the axis of the cylinder along the recording material on a guide device. The recording head contains a plurality of light waveguides which are formed by glass fibers and conduct modulated light from individual sources to be projected onto the recording medium.

Presently known devices for non-contacting recording of the material will employ recording means such as ink jets or utilize light beams or rays. An example of a non-contact recording device utilizing light rays is disclosed in U.S. Pat. No. 1,751,584.

These known installations are costly as a rule. The device operating with light beams or rays in general also have the disadvantage of requiring a large amount of space.

SUMMARY OF THE INVENTION

The present invention is directed to providing an optical device, which is an economical facsimile apparatus and requires a minimum space requirement, which is approximately the space requirement of a normal typewriter.

The object of the present invention is achieved by means of an improvement in an optical device for non-contact recording image information on a recording material, said device having a cylinder for supporting a sheet type recording material in a stretched cylindrical configuration, a recording head being mounted on a guide device for movement parallel to the cylindrical axis with the head being spaced a minimum distance from said stretched recording material, said recording head containing a plurality of light waveguides in the form of glass fibers having exit ends and entrance ends, said exit ends facing the recording material and being arranged linearly and densely packed adjacent to one another, said entrance ends positioned to receive modulated light from individual light sources so that the image information in the form of image points is modulated into the individual light sources to be carried by the individual waveguides to the exit ends for projection onto the recording medium. The improvement comprises that the recording head includes at least one adjustment plate having a plurality of individual grooves with one groove being provided for each of the waveguides, said waveguides being secured in said grooves with the exit ends being oriented in a line extending perpendicular to the axis of the cylinder, said recording head including a light source member secured thereon, said light source member having the individual light source for each of the waveguides and means enabling individual exciting or activation of each of the light sources in accordance with the image information to be produced, said light sources being arranged in said member with a spacing corresponding to the spacing of the entrance ends of the fibers so that when the member is secured on the recording head, the individual light sources are aligned with the respective entrance ends of the fibers.

The optical device of the present invention is characterized in that the individual waveguides are fixed true to size in their relative position and in the desired spatial arrangement by at least one adjustment plate and that a member contains an individual light source for each of the fibers which are also spatially arranged with the desired spacing corresponding to the spacing of the entrance ends of the fibers in the head so that attachment of the member to the head automatically aligns the individual light sources with the entrance ends of each of the fibers.

The optical device of the present invention has the advantage that a non-contact recording of image information such as random facsimile reproductions can be carried out and realized in a relatively economical space. In addition, the recording can be carried out in a relatively simple fashion which thus has a lower chance of malfunction and can be accomplished relatively economically.

Preferably, the recording head has a concave surface with a radius of curvature which is approximately equal to the radius of curvature of the cylinder plus the minimum spacing between the recording head and the surface of the cylinder. The recording head used the adjustment plates which is preferably of a semi-conductor material so that the grooves can be formed photolithographically therein. The materials are selected from a group consisting of Si, GaAs, and GaP.

The plates can have the grooves extending parallel to each other or they can be converging towards the exit sides so that the entrance ends have sufficient spacing for the light sources but the exit ends have a smaller spacing to attain a maximum resolution of the image information being recorded on the material. When using plates, a pair of plates can be arranged with their grooves facing each other and aligned in groove pairs which receive a single fiber. It is also possible that the plates are arranged with the grooves facing each other and offset from each other so that two closely spaced rows of grooves are provided with the grooves in one row being disposed between the grooves of the other row so that when the fibers are placed in the grooves, two rows of fibers are created with one row being slightly offset relative to the other row. The fibers are preferably cemented in the grooves and the plate with the fibers and the light source member are preferably encapsulated in a resinous potting material.

The individual light sources can be incandescent lamps, light emitting diodes or semi-conductor laser diodes. When the sources are either light emitting diodes or semi-conductor laser diodes, the light source member preferably includes a chip of a suitable semi-conductor material in which these diodes are formed in a row by suitable semi-conductor technology. The light source member also preferably includes multipoint connectors containing a connection for each of the light sources which project from the light source member as part of the means enabling individual exciting of each light source. The individual exciting can be accomplished by a micro-computer arrangement which activates each of the light sources with the necessary information to be recorded.

BRIEF DESCRIPTION OF THE DRAWINGS

FIG. 1 is a schematic end view of an optical device in accordance with the present invention;

FIG. 2 is a perspective view of an arrangement of adjustment plates and fibers in accordance with the present invention;

FIG. 3 is a side view of a recording head in accordance with the present invention;

FIG. 3a is an enlarged view taken in the circle IIIa of FIG. 3;

DESCRIPTION OF THE PREFERRED EMBODIMENTS

Figure 4:
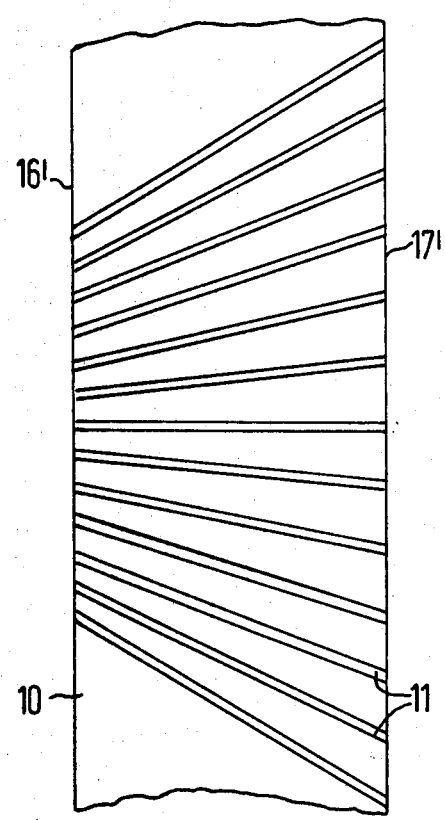
FIG. 4 is a plan view of an embodiment of the adjustment plate in accordance with the present invention.

The principles of the present invention are particularly useful in an optical device generally indicated at 15 and schematically illustrated in FIG. 1. The optical device 15 has a cylinder 1 with a recording head containing a number of light waveguides 2 which have exit ends 16 spaced close to the cylindrical surface of the cylinder 1 which carries a recording carrier such as a sheet of paper. The fibers 2 have an entrance end 17 in which light will be coupled into for travel to the exit ends 16. The light that is coupled into has its intensity changed or adjusted in view of the particular image point that is to be recorded on the carrier material such as by electrophotographic process.

In actual construction, the waveguides 2 are arranged in a recording head 6 (see FIG. 3) which moves along a guide device, which is schematically illustrated at 18 in FIG. 1, along a direction parallel to the axis of the cylinder 1. As illustrated, the exit ends 16 of the fibers forming the waveguides 2 extend in a line substantially perpendicular to the axis of the cylinder 1.

The fibers forming the waveguides 2 are positioned in the head 6 by use of one or more adjustment plates. As illustrated in FIG. 2, a pair of the plates 3 have a series of photolithographically etched grooves 19 which are facing each other and aligned in pairs with a pair of grooves receiving the fiber forming the waveguide 2. As illustrated, the grooves 19 enable spacing the waveguides 2 in a very close relationship to one another with a packing density of eight waveguides to one millimeter. The plates are approximately one centimeter high so that movement of the head 6 along the cylinder 1 will record a strip approximately 1 centimeter in width.

To form the precise true to size array of light waveguides 2 in the adjustment plates 3, the grooves 19 are provided in each plate by a photolithographic technique. Preferably, the plates 3 consist of a semi-conductor material selected from a group consisting of Si, GaAs, and GaP. The grooves 19 are formed by a photolithographic technique involving etching. The manufacturing methods for making guide plates or adjustment plates by a photolithographic process are known (see C. M. Schroeder, "Accurate Silicon Spacer Chips for an Optical Cable Connector", *The Bell Systems Technical Journal,* vol. 57, no. 1, January 1978, pages 91-97). It is also noted that an array of waveguides in front of a recording cylinder is known as disclosed by the above mentioned U.S. Pat. No. 1,751,584.

After forming the grooves 19 in the adjustment or guide plates 3, the waveguides are inserted in the aligned pairs of grooves and the plates are cemented together with the waveguides being cemented in the aligned pairs of grooves. The cemented together plates containing the waveguides are then cut at one end to form an end surface 20 for the entrance ends of the various waveguides. This surface 20 is polished and then a light source member 7 is joined to the plates forming the head 6.

The light source member 7 as best illustrated in FIG. 3a contains a plurality of light sources such as light emitting diodes or LED 9, which are spaced at an interval corresponding to the spacing of the entrance 17 for the fibers 2. To form the plurality of LED's 9, the light source member 7, includes a chip of suitable semi-conductor material in which the LED's are formed in an integrated fashion utilizing semi-conductor technology. The light source member 7 also includes means for connecting each of the light sources such as the LED's 9 to a suitable control circuit or means for exciting 21, which controls the energizing or exciting of the sources in response to the particular amount of light to be emitted. To form this connection, the member 7 has a multi-point connector 8 with connecting prongs which are received in sockets connected to the means for each of the light sources. The member 7 is then secured onto the plates forming the head 6 and the entire arrangement is then encapsulated in a synthetic resin material.

After the encapsulating with the synthetic resin material, the block is cut and polished on its front end surface by being cut as illustrated in FIG. 3 to form a concave cylindrical surface 5 having a radius of curvature as indicated by the arrow 4 which is approximately greater than the radius of curvature of the cylinder by an amount equal to the minimum spacing of the surface 5 from the cylindrical surface of the cylinder 1. Thus, the exit end 16 are exposed and lie in a minimum distance relative to the surface of the cylinder which may be an electrophotographic cylinder or onto the paper carried on the cylinder.

In the embodiments of the plates 3 illustrated in FIG. 2, the grooves 19 were parallel. However, it may be desirable that the grooves do not extend parallel to one another as illustrated in FIG. 2. An embodiment of the adjustment plate 10 is illustrated in FIG. 4 and has grooves 11. The grooves 11 extend from a surface 16' to a second surface 17'. The surface 16' will be adjacent to the surface containing the exit ends 16 of the fibers to be received in the grooves 11 and as illustrated, the grooves 11 converge from the surface 17' towards the surface 16'. Thus, the converging grooves 11 enable obtaining the necessary packing density for the exit ends of the waveguides in the grooves 11 at the surface adjacent the electrophotographic cylinder or the photosensitive paper stretched on the cylinder 1 but allow a greater spacing at the entrance end to provide greater spacing for the light sources such as the light emitting diodes or other sources.

Figure 5:
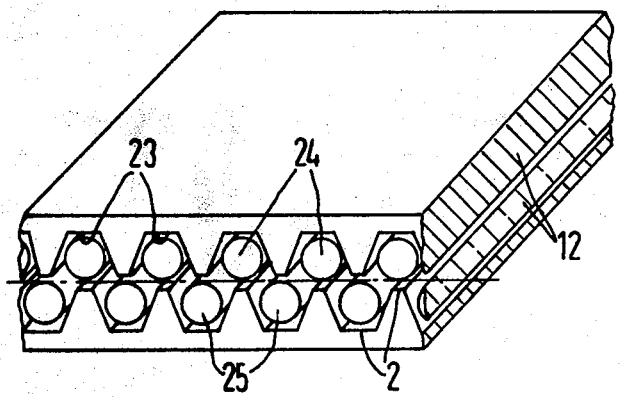
FIG. 5 is a perspective view of another arrangement of adjustment plates in accordance with the present invention.

Another advantageous embodiment arrangement for the waveguides 2 is illustrated in FIG. 5. In this arrangement, a pair of adjustment plates 12 are utilized which have grooves 23. Each of the grooves 23 are of sufficient size to entirely receive a single waveguide fiber 2. As illustrated, the plates 12 are aligned with each other with the grooves in one of the plates being offset from the grooves in the other plates so that two rows of grooves are provided and each plate having portions between adjacent grooves which portions are aligned with the grooves of the opposite plate to act to partially close the grooves of the opposite plate. Thus, the waveguides 2 are received in the grooves form two rows 24 and 25 of waveguides with the waveguides in a row 24 being interposed between the waveguides in the row 25. The two plates 12 with the waveguides are then joined together by cementing and eventually encapsulated as in the previously described embodiment. This further development of the invention offers the advantage that the light waveguides with a greater diameter can be employed with a consequence of overlapping, which is illustrated in the embodiment of FIG. 5. By this means, fringing during recording is advantageously avoided.

While the light sources discussed hereinabove were LED's 9, other light sources such as incandescent lamps can be utilized. In addition, semi-conductor laser diodes may be used as an individual light source and these semi-conductor lasers can be formed on a chip of semi-conductor material in an integrated form by utilizing semi-conductor technology.

The actual control of the activation of each of the individual light sources can be utilized in conventional external control circuits 21. It is also possible to use microprocessors or computers to control the actuation of the individual light sources so that the desired point of light illumination on the cylinder surface or sheet carried by the cylinder will occur.

Although various minor modifications may be suggested by those versed in the art, it should be understood that I wish to embody within the scope of the patent granted hereon, all such modifications as reasonably and properly come within the scope of my contribution to the art.

I claim:

1. In an optical device for non-contact recording image information on a recording material, said device having a cylinder for supporting a sheet type recording material in a stretched cylindrical configuration, a recording head being mounted on a guide device for movement parallel to the cylindrical axis with the head being spaced a minimum distance from said stretched recording material, said recording head containing a plurality of light waveguides in the form of glass fibers having exit ends and entrance ends, said exit ends facing the recording material and being arranged linearly and densely packed adjacent to one another, said entrance ends positioned to receive modulated light from individual light sources so that the image information in the form of image points is modulated into the individual light sources to be carried by the individual waveguides to the exit end for projection onto the recording medium, the improvements comprising the recording head including a pair of adjustment plates having a plurality of individual straight grooves of sufficient size to entirely receive a single waveguide fiber extending inward from one edge surface of each plate and with each plate having grooves for half of the waveguides forming the recording head, said waveguides being secured in said grooves with the exit ends being adjacent said one edge surface and being oriented in a line extending perpendicular to the axis of the cylinder, said straight grooves of each adjustment plate converging from a point adjacent the entrance end of each of the fibers towards the one edge surface having the exit ends so that the spacing between the exit ends of each of the fibers is substantially smaller than the spacing between the entrances ends to enable obtaining a maximum resolution of the image information being recorded on said material while maintaining space for the light source, said plates being positioned together with the grooves of one plate facing the grooves of the other plate and being disposed therebetween to form two rows of grooves with each plate having portions between adjacent grooves being aligned with the grooves of the opposite plate to act to partially close the grooves of the opposite plate, said fibers in said grooves forming two closely spaced rows with adjacent fibers being in different rows, said recording head including a light source member secured thereon, said light source member including a chip of a suitable semiconductor material having the individual light source for each of the waveguides and means enabling individual exciting of each of the light sources in accordance with the image information to be produced and being a multipoint connector containing the necessary electrical connections for each individual light source, said light sources comprising light emitting diodes being formed in the chip and being arranged in two rows with a spacing corresponding to the spacing of the entrance ends of the fibers and with the sources in one row being slightly offset with respect to the sources of the other row the same amount as said fibers so that with the securing of the light source member onto the recording head, the individual light sources are aligned with the respective entrance ends of the fibers, said plates and said member being encapsulated in a resinous potting material, and said recording head having a concave surface facing the cylindrical surface, said concave surface having a radius of curvature greater than the radius of curvature of the cylinder by an amount equal to the spacing therebetween.

2. In an optical device according to claim 1, wherein the individually exciting of the light sources is accomplished by a micro-computer arrangement using e.g. Intel 8080 or Intel 8086.

3. In an optical device according to claim 1, wherein each of the light emitting diodes is in the form of a semi-conductor laser.

4. In an optical device according to claim 1, wherein each of the adjustment plates consist of a semi-conductor material composed of silicon, said plates having the grooves photolithographically etched therein.

5. In an optical device according to claim 1, wherein each of the adjustment plates is composed of a semi-conductor material, said semi-conductor material being GaAs, said grooves being photolithographically etched into the surface of each plate.

6. In an optical device according to claim 1, wherein each of the plates is composed of a semi-conductor material of GaP and each of the grooves is photolithographically etched therein.

* * * * *